US009798292B2

(12) United States Patent
Meusburger

(10) Patent No.: US 9,798,292 B2
(45) Date of Patent: Oct. 24, 2017

(54) METHOD AND SYSTEM FOR PRESENTING TIME ON AN APPLIANCE

(71) Applicant: General Electric Company, Schenectady, NY (US)

(72) Inventor: Eric Xavier Meusburger, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 3 days.

(21) Appl. No.: 14/604,861

(22) Filed: Jan. 26, 2015

(65) Prior Publication Data

US 2016/0216696 A1    Jul. 28, 2016

(51) Int. Cl.
| | | |
|---|---|---|
| *G04G 7/00* | (2006.01) | |
| *H04L 29/08* | (2006.01) | |
| *H04W 76/02* | (2009.01) | |
| *H04W 56/00* | (2009.01) | |
| *G04G 5/00* | (2013.01) | |
| *H04L 29/06* | (2006.01) | |

(52) U.S. Cl.
CPC .............. *G04G 7/00* (2013.01); *G04G 5/00* (2013.01); *H04L 67/10* (2013.01); *H04L 69/28* (2013.01); *H04W 56/0015* (2013.01); *H04W 76/023* (2013.01)

(58) Field of Classification Search
CPC ....................................................... G04G 7/00
See application file for complete search history.

(56) References Cited

U.S. PATENT DOCUMENTS

| | | | | |
|---|---|---|---|---|
| 7,069,091 | B2* | 6/2006 | Williamson | H05B 6/688 219/697 |
| 7,129,823 | B2* | 10/2006 | Shintani | H04B 3/542 340/12.32 |
| 7,151,968 | B2* | 12/2006 | Williamson | A47J 31/52 340/538 |
| 8,816,829 | B2* | 8/2014 | Beck | H02J 13/0048 340/12.32 |
| 8,873,342 | B1* | 10/2014 | Boudreaux | G04B 37/0083 368/46 |
| 8,996,628 | B2* | 3/2015 | Bishel | H04L 12/2814 340/3.31 |
| 2002/0140547 | A1* | 10/2002 | Litwin, Jr. | G04G 7/00 375/354 |
| 2004/0058706 | A1* | 3/2004 | Williamson | H04N 21/25891 455/557 |
| 2007/0046489 | A1* | 3/2007 | Fair | H05B 37/0245 340/4.3 |
| 2008/0157938 | A1* | 7/2008 | Sutardja | G08C 19/00 340/12.32 |

(Continued)

FOREIGN PATENT DOCUMENTS

CN            203480243 U       3/2014

Primary Examiner — Amy Cohen Johnson
Assistant Examiner — Jason Collins
(74) Attorney, Agent, or Firm — Dority & Manning, P.A.

(57) ABSTRACT

A method and related system for presenting time on an appliance. The method includes connecting at least a first and second appliance to each other with a network, establishing a time of day, presenting the time of day on a display of the first appliance, and deactivating a display of the second appliance such that the time of day is not presented on the display of the second appliance.

20 Claims, 2 Drawing Sheets

(56) References Cited

U.S. PATENT DOCUMENTS

| | | | |
|---|---|---|---|
| 2011/0170377 A1* | 7/2011 | Legaspi | G08B 25/009 367/199 |
| 2012/0311493 A1* | 12/2012 | Sohn | H04M 1/72547 715/808 |
| 2013/0058197 A1* | 3/2013 | Yonekura | G04G 19/12 368/10 |
| 2013/0194898 A1* | 8/2013 | Kato | G04G 19/06 368/66 |
| 2014/0086233 A1 | 3/2014 | Chhabra et al. | |
| 2014/0253487 A1* | 9/2014 | Bezinge | G04G 17/045 345/173 |
| 2015/0128203 A1* | 5/2015 | Hoang | H04H 20/426 725/153 |

* cited by examiner

METHOD AND SYSTEM FOR PRESENTING TIME ON AN APPLIANCE

FIELD OF THE INVENTION

The present subject matter relates generally to methods and systems for operating appliances, such as networked appliances. More particularly, the present subject matter relates to methods and systems for presenting time on displays of appliances.

BACKGROUND OF THE INVENTION

Certain appliances include displays that may be programmed to present a clock with the time of day. In addition, houses generally have multiple appliances that each includes a display with a clock. Thus, a single room, such as a kitchen, may have a clock displayed on each appliance within the room. Multiple clocks within one room may be visually unpleasant and/or needlessly consume valuable energy.

To present the correct time of day, a user of the appliance is generally required to manually enter the time of day with inputs of the appliance. After entering the correct time of day, the display presents the clock and the user may view the time of day on the display of the appliance. Manually setting the clock on each appliance within a house can be tedious and time consuming. For example, manually resetting the clock on each appliance after a power outage can be tedious and time consuming. However, if all the clocks are not reset, the clocks may flash in a manner that is visually unpleasing to certain users.

Accordingly, a method for assisting with setting clocks of appliances and with presenting time on displays of the appliances would be useful.

BRIEF DESCRIPTION OF THE INVENTION

The present subject matter provides a method for presenting time on an appliance. The method includes connecting a plurality of appliances to each other with a network, establishing a time of day, presenting the time of day on a display of a first one of the plurality of appliances, and deactivating a display of a second one of the plurality of appliances such that the time of day is not presented on the display of the second one of the plurality of appliances. A related system for presenting time on an appliance is also provided. Additional aspects and advantages of the invention will be set forth in part in the following description, or may be apparent from the description, or may be learned through practice of the invention.

In a first exemplary embodiment, a method for presenting time on an appliance is provided. The method includes connecting a plurality of appliances to each other with a network, establishing a time of day, presenting the time of day on a display of a first one of the plurality of appliances, and deactivating a display of a second one of the plurality of appliances such that the time of day is not presented on the display of the second one of the plurality of appliances.

In a second exemplary embodiment, a system for presenting time on an appliance is provided. The system includes a first appliance having a display and a second appliance having a display. A network is configured for communicating with the first appliance and the second appliance. The first and second appliances are configured such that a time of day is presented on either the display of the first appliance or the display of the second appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
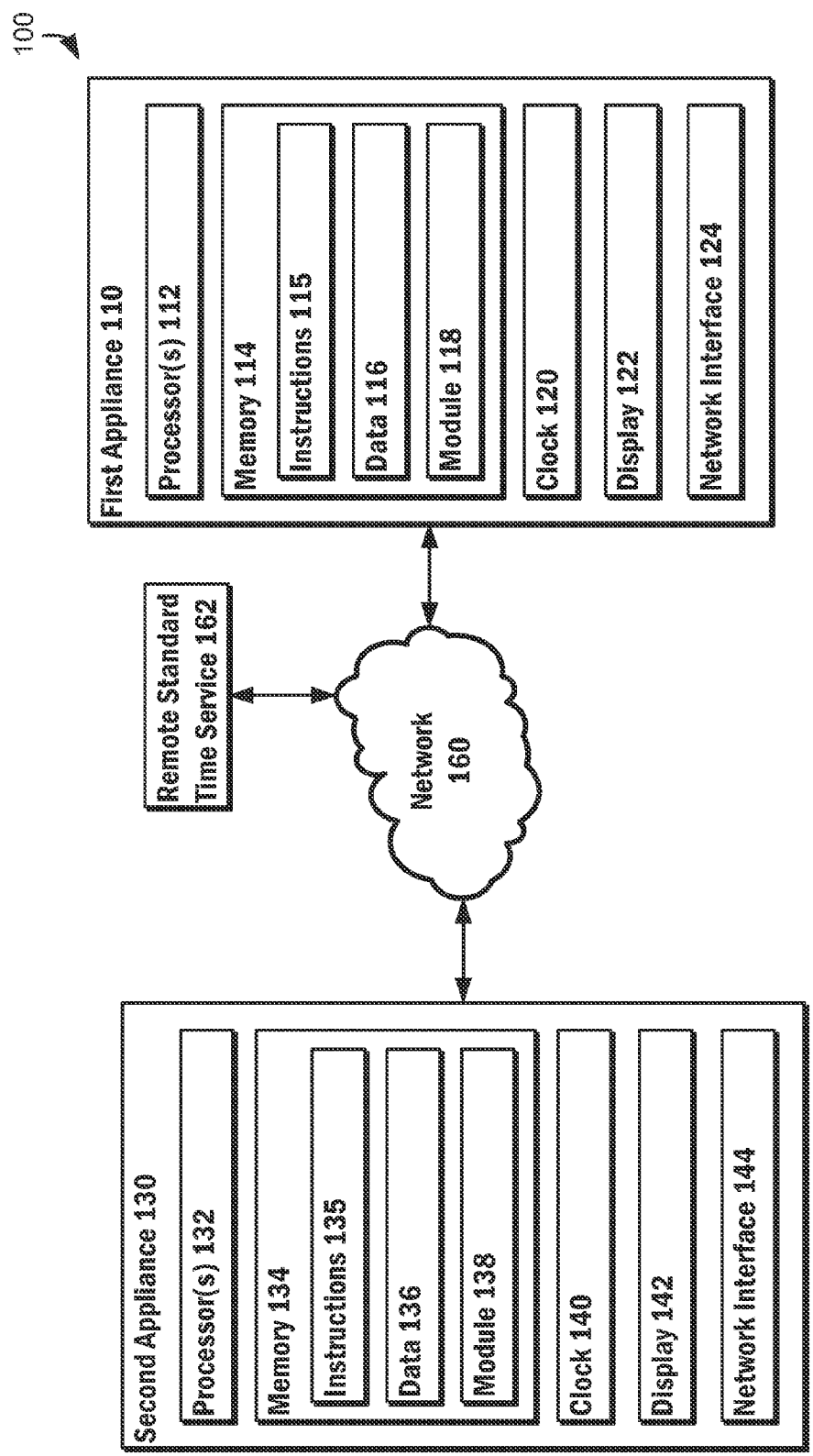
FIG. 1 provides a schematic view of a system for presenting time on an appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of a system 100 for presenting time on an appliance according to an exemplary embodiment of the present subject matter. System 100 includes a first appliance 110, a second appliance 130, and a network 160. First appliance 110 and second appliance 130 are in communication with one another via network 160. In alternative exemplary embodiments, system 100 may include additional appliances, e.g., one additional appliance, two additional appliances, three additional appliances or more additional appliances, that communicate with one another and first and second appliance 110, 130 via network 160. Appliances of system 100, including first appliance 110 and second appliance 130, may be positioned within a single building or house, e.g., within a common room within the house. As discussed in greater detail below, system 100 includes features for presenting time on an appliance of system 100, such as on one of first appliance 110 and second appliance 130.

As will be understood by those skilled in the art, system 100 has peer-to-peer architecture in the exemplary embodiment presented in FIG. 1. However, the exemplary embodiment presented in FIG. 1 is provided by way of example only. In alternative exemplary embodiments, system 100 can be implemented using other suitable architectures, such as client-server architecture. Thus, e.g., first and second appliance 110, 130 may communication with each other over network 160 via a server.

First appliance 110 includes one or more processors 112, a memory 114, and a network interface 124. As used herein, an appliance can be any machine or device for performing a specific task that also includes a display for presenting a clock, including, without limitation, a clothes dryer, a clothes washer, a dishwasher, a refrigerator, a stove, an oven, an HVAC system controller or programmable thermostat, a security system or any other suitable appliance.

Network interface 124 of first appliance 110 can include any suitable components for interfacing with one more networks, such as network 160. For example, network interface 124 of first appliance 110 may include transmitters, receivers, ports, controllers, antennas, or other suitable components.

The processor(s) 112 of first appliance 110 can be any suitable processing device, such as a microprocessor, microcontroller, integrated circuit, or other suitable processing device. The memory 114 of first appliance 110 can include any suitable computing system or media, including, but not limited to, non-transitory computer-readable media, RAM, ROM, hard drives, flash drives, or other memory devices. The memory 114 of first appliance 110 can store information accessible by processor(s) 112 of first appliance 110, including instructions 115 that can be executed by processor(s) 112 of first appliance 110 to control various components of first appliance 110 to provide appliance functionality and data 116.

A module 118 is included or stored in memory 114 of first appliance 110. It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media. Thus, while module 118 is shown stored in memory 114 of first appliance 110 in the exemplary embodiment shown in FIG. 1, module 118 may be stored in or implemented by any other suitable component of system 100 in alternative exemplary embodiments.

As may be seen in FIG. 1, first appliance 110 also includes a clock 120 and a display 122. Clock 120 may be any suitable type of time keeping mechanism. For example, clock 120 may be a real time clock integrated within a control board of first appliance 110. Clock 120 is configured for keep current time such that the current time may be presented on display 122 of first appliance 110. Thus, display 122 may be any suitable type of mechanism for visually presenting the current time to a user of first appliance 110. For example, display 122 may be a liquid crystal display (LCD), a vacuum fluorescent display (VFD), a series of seven-segment displays, an array of light emitting diodes (LEDs), etc. Clock 120 of first appliance 110 may keep track of the current time, and the current time may be presented to the user of first appliance 110 on display 122.

Second appliance 130 includes similar features and components as first appliance 110. For example, second appliance 130 includes one or more processors 132, a memory 134, instructions 135, data 136, at least one module 138, a clock 140, a display 142 and a network interface 144. The one or more processors 132, memory 134, instructions 135, data 136, module 138, clock 140, display 142 and network interface 144 may be constructed of or with the same or similar components described above for the corresponding elements of first appliance 110.

First and second appliances 110, 130 may be any suitable types of appliances and combination of appliances. Thus, it will be understood that while first appliance 110 and second appliance 130 may share similar or common components, first appliance 110 and second appliance 130 may be different types appliances, in certain exemplary embodiments. For example, first appliance 110 may be a range appliance, and second appliance 130 may be an over-the-range microwave appliance. In alternative exemplary embodiments, first and second appliances 110, 130 may be the same type of appliances. For example, both first and second appliances 110, 130 may be oven appliances.

System 100 may also include a server (such as a wireless hub) and a client for assisting with regulating operation of first and second appliances 110, 130. Each of the server and client may include one or more processors and a memory, e.g., the same or similar type of processors and memory described above for first appliance 110. The memory of the server and client can store information accessible by processor(s) of the server and client that can be executed by processor(s) of the server and client to control various components of first and second appliance 110, 130. The client can be any suitable type of computing device, such as a general purpose computer, special purpose computer, laptop, desktop, integrated circuit, mobile device, smartphone, tablet, wearable computing device, or other suitable computing device. Thus, a user of first and second appliances 110, 130 may regulate operation of first and second appliances 110, 130 remotely with the client via the server.

As discussed above, first appliance 110 and second appliance 130 are in communication with one another via network 160. The network 160 can be any type of communications network, such as a local area network (e.g. intranet), wide area network (e.g. Internet), or some combination thereof. The network 160 can also include a direct connection between first appliance 110 and second appliance 130. In general, communication between first appliance 110 and second appliance 130 can be carried via the network interface using any type of wired and/or wireless connection, using a variety of communication protocols (e.g. TCP/IP, HTTP), encodings or formats (e.g. HTML, XML), and/or protection schemes (e.g. VPN, secure HTTP, SSL).

As discussed in greater detail below, first and second appliances 110, 130 are configured such that a time of day is presented on either display 122 of first appliance 110 or display 142 of second appliance 130. In particular, first and second appliances 110, 130 may be configured such that: (1) display 122 of first appliance 110 is deactivated when display 142 of second appliance 130 is presenting the time of day; and (2) display 142 of second appliance 130 is deactivated when display 122 of first appliance 110 is presenting the time of day. Further, all displays of the appliances of system 100 may be deactivated except a display of one of the appliances of system 100, e.g., when system 100 includes more appliances than first and second appliance 110, 130. Thus, system 100 may permit a single display of system 100 to present the current time of day to a user of system 100. In such a manner, system 100 may assist with reducing energy consumption of appliances associated with system 100 and/or with redundant information to the user of system 100.

System 100 may also assist with synchronizing the various clocks of the appliances of system 100, such as clock 120 of first appliance 110 and clock 140 of second appliance 130. As an example, a user of system 100 may utilize a user input, such as a touch screen, buttons, dials, etc., of first appliance 110 to manually establish the current time of day at first appliance 110, and first appliance 110 may transit the current time of day to other appliances of system 100, such as second appliance 130, via network 160. As another example, network 160 (e.g., the server of system 100) may receive the current time of day from a remote standard time service 162, such as an online atomic clock or time.gov, and network 160 may communicate the current time of day to each appliance of system 100, such as first and second appliance 110, 130.

Figure 2:
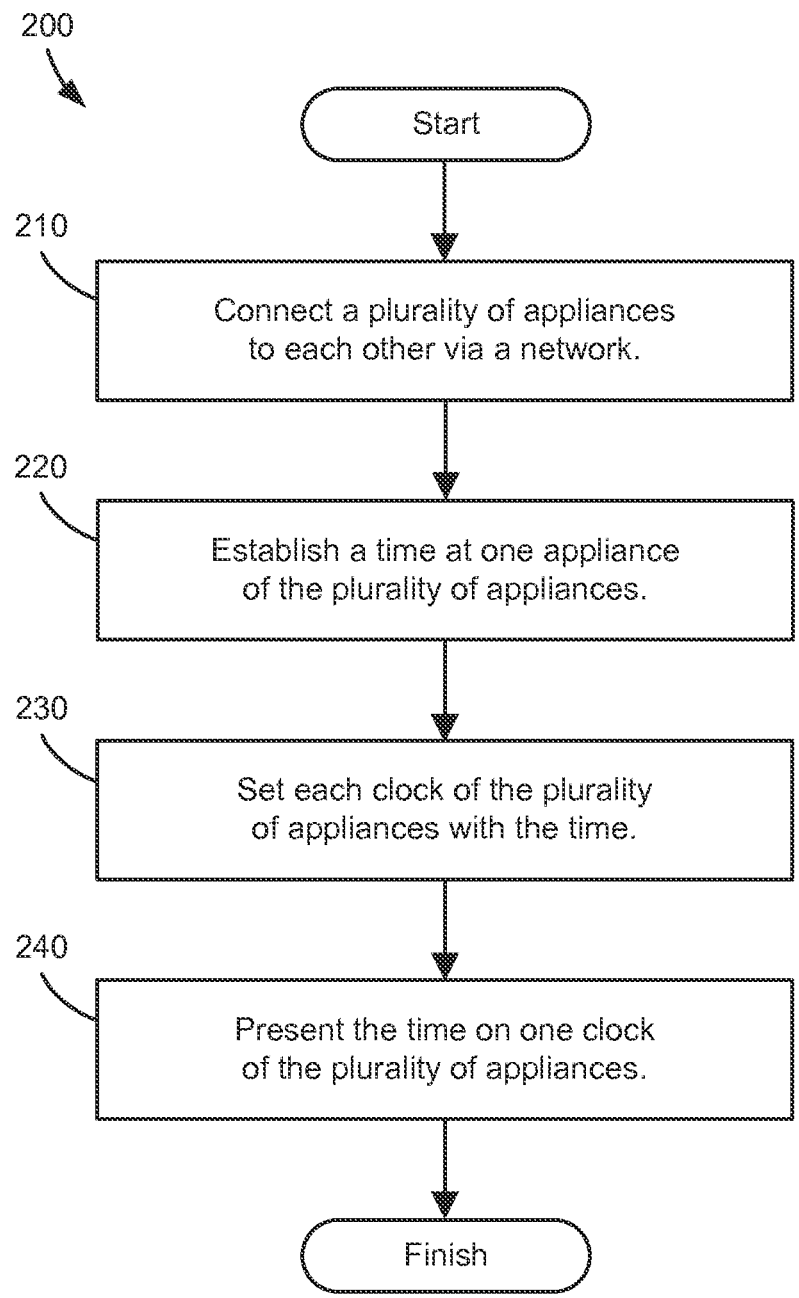
FIG. 2 illustrates a method for presenting time on an appliance according to an exemplary embodiment of the present subject matter.

FIG. 2 illustrates a method 200 for presenting time on an appliance according to an exemplary embodiment of the present subject matter. Method 200 can be used to operate any suitable appliance or system of appliances. For example, method 200 may be used with system 100 (FIG. 1). In particular, utilizing method 200, a current time of day may be presented on one of display 122 of first appliance 110 and display 142 of second appliance 130, as discussed in greater detail below.

At step 210, first and second appliance 110, 130 are connected to each other with network 160. For example, first appliance 110 may connect to network 160 with network interface 124 of first appliance 110, and second appliance 130 may connect to network 160 with network interface 144 of second appliance 130. As discussed above, network 160 may be a wireless network, such as a Wi-Fi or Bluetooth network.

At step 220, a current time of day is established, e.g., at one of first appliance 110 and second appliance 130. As an example, a user of system 100 may manually enter the current time of day with a user input of first appliance 110 or a user input of second appliance 130. As another example, network 160 may connect to remote standard time service 162 and receiving the current time of day from remote standard time service 162 via network 160. Thus, clock 120 of first appliance 110 and clock 140 of second appliance 130 may be synchronized to a clock at remote standard time service 162 via network 160. With the current time of day established at step 220, each clock of the appliances of system 100 may be set or synchronized with the current time of day, e.g., via network 160, at step 230.

At step 240, the current time of day is presented on a display of an appliance of system 100, e.g., on either display 122 of first appliance 110 or display 142 of second appliance 130. In particular, the current time of day may be presented on only one display of the appliances of system 100, such as on either display 122 of first appliance 110 or display 142 of second appliance 130. Thus, a primary display of system 100, such as the display most visible within the room housing appliances of system 100, may be selected by a user of system 100 at step 240 for presenting the current time of day.

Step 240 may also include deactivating a display the appliances of system 100, such as display 122 of first appliance 110 or display 142 of second appliance 130, such that the current time of day is not presented on certain displays of appliances of system 100. At step 240, all displays of the appliances of system 100 may be deactivated except one display presenting the current time of day. Thus, the primary display may be the only display in system 100 that presents the current time of day to the user of system 100. Deactivations signals may be transmitted to all the appliances of system 100 except the appliance with the one display presenting the current time of day via network 160 at step 240.

Method 200 may assist with reducing the energy consumption and/or clock duplication of system 100. In particular, system 100 may have a cleaner and/or more appealing appearance to the user of system 100 due to the reduced presentations of clocks on appliances of system 100. In addition, method 200 may assist with synchronizing clocks of system 100 in order to avoid requiring manual time setting at each appliance of system 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for presenting time on an appliance, comprising:
    connecting a plurality of appliances to each other with a network;
    establishing a time of day;
    presenting the time of day on a display of a first one of the plurality of appliances, the display of the first one of the plurality of appliances corresponding to a user-selected primary display; and
    deactivating a display of a second one of the plurality of appliances when the display of the first one of the plurality of appliances is presenting the time of day such that the time of day is not presented on the display of the second one of the plurality of appliances.

2. The method of claim 1, wherein said step of connecting comprises connecting the plurality of appliances to each other with a wireless network.

3. The method of claim 1, wherein said step of establishing comprises manually entering the time of day with a user input of the first one of the plurality of appliances.

4. The method of claim 3, further comprising transmitting the time of day from the first one of the plurality of appliances to at least the second one of the plurality of appliances.

5. The method of claim 1, wherein said step of establishing comprises receiving the time of day from a standard time service via the network.

6. The method of claim 1, further comprising setting a clock of each appliance of the plurality of appliances with the time of day.

7. The method of claim 1, wherein said step of presenting the time of day comprises presenting the time of day on only the display of the first one of the plurality of appliances.

8. The method of claim 7, wherein said step of deactivating comprises deactivating all displays of the plurality of appliances except the display of the first one of the plurality of appliances.

9. The method of claim 1, wherein the plurality of appliances comprises more than three appliances and less than ten appliances.

10. The method of claim 1, wherein the plurality of appliances includes a range appliance and a microwave appliance.

11. The method of claim 1, wherein each appliance of the plurality of appliances are positioned in a common room.

12. A system for presenting time on an appliance, comprising:
    a first appliance having a display;
    a second appliance having a display; and
    a network configured for communicating with the first appliance and the second appliance, wherein the first and second appliances are configured such that a time of day is presented on either the display of the first appliance or the display of the second appliance, the display of the first appliance corresponding to a user-selected primary display, and wherein the first and second appliances are configured such that the display of the first appliance is deactivated when the display of the second appliance is presenting the time of day and the display of the second appliance is deactivated when the display of the first appliance is presenting the time of day.

13. The system of claim 12, wherein the network is a wireless network.

14. The system of claim 12, wherein the first and second appliances each include a user input configured for manual entry of the time of day.

15. The system of claim 12, wherein the network is configured for receiving the time of day from a standard time service.

16. The system of claim 12, wherein the network is configured for transmitting the time of day to the first and second appliances.

17. The system of claim 12, further comprising a third appliance with a display, the network configured for communicating with the first appliance, the second appliance and the third appliance, the first, second and third appliances configured such that the time of day is presented on only one display of the first, second and third appliances.

18. The system of claim 12, wherein the first appliance is a range: appliance and the second appliance is a microwave appliance.

19. The system of claim 12, wherein the first and second appliances are positioned in a common room.

20. A method for presenting time on an appliance, comprising:

connecting a plurality of appliances to each other with a wireless network, the plurality of appliances including a range appliance and a microwave appliance;

establishing a time of day at one of the plurality of appliances, manually entering the time of day with a user input of one of the plurality of appliances;

synchronizing the time of day at each of the plurality of appliances;

presenting the time of day on a display of a first one of the plurality of appliances, the display of the first one of the plurality of appliances corresponding to a user-selected primary display; and deactivating all remaining displays of the plurality of appliances, wherein deactivating all remaining displays includes transmitting a deactivation signal to each display of the plurality of appliances except the display of the first one of the plurality of appliances upon presenting the time of day on the display of the first one of the plurality of appliances.

* * * * *